United States Patent [19]

Martin

[11] 4,390,713
[45] Jun. 28, 1983

[54] QUATERNARY AMMONIUM-FUNCTIONAL SILICON COMPOUNDS

[75] Inventor: Eugene R. Martin, Onsted, Mich.

[73] Assignee: SWS Silicones Corporation, Adrian, Mich.

[21] Appl. No.: 380,494

[22] Filed: May 21, 1982

[51] Int. Cl.³ .............................................. C07F 7/10
[52] U.S. Cl. .................................. 556/418; 556/419; 8/115.5
[58] Field of Search ............................... 556/418, 419

[56] References Cited

U.S. PATENT DOCUMENTS

| | | | |
|---|---|---|---|
| 2,415,017 | 1/1947 | MacKenzie | 556/419 X |
| 2,637,623 | 5/1953 | Janes | 556/419 X |
| 2,838,423 | 6/1958 | Gilkey | 556/419 X |
| 3,700,844 | 10/1972 | Domba | 556/419 X |
| 3,734,763 | 5/1973 | Plueddemann | 556/419 X |
| 3,819,675 | 6/1974 | Plueddemann | 556/418 X |
| 4,312,993 | 1/1982 | Martin | 556/419 |
| 4,342,742 | 8/1982 | Sebag et al. | 556/418 X |

Primary Examiner—Paul F. Shaver

[57] ABSTRACT

Quaternary ammonium-functional silicon compounds are prepared by reacting carbinol-functional quaternary ammonium compounds with carboxylic acid-functional silicon compounds. These quaternary ammonium-functional silicon compounds may be used as antistatic finishes for textiles.

17 Claims, No Drawings

QUATERNARY AMMONIUM-FUNCTIONAL SILICON COMPOUNDS

The present invention relates to quaternary ammonium compounds and more particularly to quaternary ammonium-functional silicon compounds and their use as antistatic agents for textile materials.

BACKGROUND OF THE INVENTION

Quaternary ammonium-functional silicon compounds have been described, for example, in U.S. Pat. No. 3,471,541 to Morehouse, in which a tertiary amine is prepared by reacting an alkenyl ether of a tertiary hydroxy polyalkyleneoxy alkylamine with a hydrosilicon compound (i.e., a silane or siloxane containing silicon-bonded hydrogen) in the presence of a platinum catalyst. The resultant tertiary amines are then reacted with hydrocarbyl halides, monocarbylic acids and hydrocarbyl esters of haloalkanoic acids to form the corresponding quaternary ammonium silicon compounds.

U.S. Pat. No. 3,661,963 to Pepe et al describes quaternary ammonium salts of chloromethylated silanes or siloxanes which are useful as antistatic agents. These quaternary ammonium salts are prepared by reacting a tertiary amine of the formula $R_3N$, where R is a monovalent organic radical, with a chloromethylarylsilane or chloromethylaralkylsilane.

U.S. Pat. No. 3,734,763 to Plueddemann describes cationic unsaturated amine functional silane coupling agents which can be applied to glass fibers to minimize the build-up of static charge on the fibers. These amine functional silane coupling agents can be prepared by reacting conjugated unsaturated alkyl halides with an aminofunctional silane.

In contrast to the quaternary ammonium-functional silicon compounds described above, the quaternary ammonium-functional silicon compounds of the present invention impart antistatic properties to textile materials which withstand repeated washings. Moreover, the quaternary ammonium-functional silicon compounds, especially the quaternary ammonium-functional polydiorganosiloxanes are prepared from commercially available materials.

Therefore, it is an object of this invention to provide a process for preparing novel quaternary ammonium-functional silicon compounds. Another object of this invention is to provide quaternary ammonium-functional silicon compounds which impart antistatic properties to textile materials. Still another object of this invention is to provide quaternary ammonium-functional silicon compounds which adhere to textile materials after repeated washings. A further object of the present invention is to provide a process for preparing quaternary ammonium-functional organopolysiloxanes which impart antistatic properties to textile materials.

SUMMARY OF THE INVENTION

The foregoing objects and others which will become apparent from the following description are accomplished in accordance with this invention, generally speaking, by providing a process for preparing quaternary ammonium-functional silicon compounds which comprises reacting carbinol-functional quaternary ammonium compounds with carboxylic acid-functional silicon compounds. These compositions may be applied to textile fibers to impart antistatic properties thereto.

DETAILED DESCRIPTION OF THE INVENTION

The carbinol-functional quaternary ammonium compounds which are reacted with the carboxylic acid-functional silicon compounds may be represented by the formulas

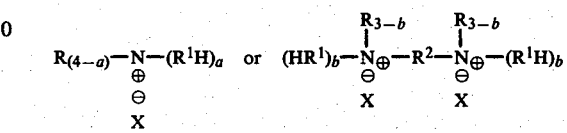

wherein R which may be the same or different is a monovalent hydrocarbon radical having from 1 to 22 carbon atoms, $R^1$ is a hydrocarbonoxy radical represented by the formula

in which the terminal carbon atom is linked to the nitrogen atom, $R^2$ is a divalent hydrocarbon radical having from 2 to 10 carbon atoms, X is an anionic radical, a is a number of from 1 to 4, b is a number of from 1 to 3, n is 2, 3 or 4 and r is a number of from 1 to 50.

Generally, any carboxylic acid-functional silicon compound can be used to make the composition of this invention. The carboxylic acid-functional silicones described in U.S. Pat. No. 3,960,574 to Lee; U.S. Pat. No. 4,011,362 to Stewart; U.S. Pat. No. 2,833,802 to Merker; and U.S. Pat. No. 3,884,860 to Brown are suitable examples of carboxylic acid-functional silicones which may be employed in this invention.

Another class of carboxylic acid-functional polysiloxane polymers which may be employed are those obtained from the reaction of cyclic anhydrides or dicarboxylic acids with aminofunctional polysiloxanes having at least one unit of the formula

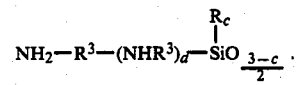

These aminofunctional polysiloxanes may also contain at least one unit of the formula

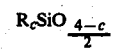

where R is the same as above, $R^3$ is a radical selected from the group consisting of a saturated divalent hydrocarbon radical having up to 10 carbon atoms, a divalent hydrocarbonoxy radical in which the oxygen is in the form an ether linkage and an unsaturated divalent hydrocarbon radical having from 3 to 10 carbon atoms, c is 0, 1, 2 or 3, and d is 0, 1 or 2.

These siloxane polymer may be endblocked with silanol, hydrocarbonoxy or triorganosilyloxy groups.

The aminofunctional polysiloxanes may be either linear or cyclic aminoalkylalkylpolysiloxanes or aminoalkylalkoxypoly-siloxanes. Aminoalkylalkylpolysiloxanes which may be employed in the process of this invention are those having at least one unit of the formula

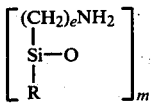

where R is the same as above, e has a value of at least 1 and up to 10 and m has a value of at least one and can be as high as 1,000 or more.

Examples of suitable aminoalkylalkylpolysiloxanes are cyclic trimers, tetamers and pentamers of gamma-aminopropylmethylsiloxane, delta-aminobutylmethylsiloxane, aminopentylmethylsiloxane and the like, as well as the hydrolyzates of gamma-aminoalkylalkyldialkoxysilanes, i.e., gamma-aminopropylmethyldialkoxysilanes with the aminopropylalkoxypolysiloxanes and the aminobutylalkoxypolysiloxanes. These aminofunctional polysiloxanes may be prepared in accordance with the process described in, for example, U.S. Pat. No. 2,947,771 to Bailey or U.S. Pat. No. 3,033,815 to Pike et al.

Other aminofunctional polysiloxane polymers which may be employed in the reaction with the dicarboxylic acids or anhydrides thereof are those described in U.S. Pat. No. 3,890,269 to Martin. These polysiloxane polymers are prepared by equilibrating a mixture containing an organopolysiloxane fluid and an aminofunctional silane or siloxane in the presence of a base catalyst.

Suitable examples of cyclic anhydrides having up to 16 carbon atoms which may be used to prepare the carboxylic acid-functional silicon compounds are succinic anhydride, glutaconic anhydride, maleic anhydride, 1,2-cyclohexane dicarboxylic anhydride, 1-cyclohexane-1,2-dicarboxylic anhydride, 3-cyclohexene, 1,2-dicarboxylic anhydride, 4-cyclohexene-1,2-dicarboxylic anhydride, 1,8-naphthalic acid anhydride, phthalic anhydride, hexahydrophthalic anhydride and methylbicyclo (2,2,1) heptane 2,3-dicarboxylic anhydride.

The reaction between the cyclic anhydride and aminofunctional polysiloxane is exothermic and may be carried out at a temperature ranging from about 25° C. up to about 150° C. or higher for times varying from a few minutes up to several hours. Although it is not essential, it is preferred that the reaction be conducted in the presence of an inert atmosphere. The reaction may also be carried out in the absence or presence of a solvent.

Generally, it is preferred that one mole of cyclic anhydride be used for every mole of amino group to be reacted. It is preferred but not essential that all the amine groups be reacted with the cyclic anhydride. A slight excess of either reactant will not alter the utility of the composition of this invention.

Another method for preparing the carboxylic acid functional polysiloxane polymers is to react dicarboxylic acids with aminofunctional polysiloxanes which are free of hydrolyzable groups.

Generally, any dicarboxylic acid having up to 16 carbon atoms can be used with the proviso that it does not contain a functional group other than a carboxylic acid group that will react with the amine group. Examples of suitable dicarboxylic acids are oxalic acid, malonic acid, succinic acid, glutaric acid, adipic acid, pimelic acid, suberic acid, 1,1-cyclopropane dicarboxylic acid, 1,2-cyclopropane dicarboxylic acid, azelaic acid, sebacic acid, 1,1-cyclobutane dicarboxylic acid, 1,3-cyclobutane dicarboxylic acid, 1-2 cyclopentane dicarboxylic acid, 1,3-cyclopentane dicarboxylic acid, phthalic acid and hexahydrophthalic acid.

The reaction between the dicarboxylic acid and aminofunctional polysiloxane is exothermic with the formation of an ammonium carboxylate. The ammonium carboxylate may be heated from 50° to 150° C. to eliminate water and form the corresponding amide. The water may be removed at atmospheric pressure or at reduced pressure. In certain instances it may be desirable to use a solvent capable of azeotroping with the water to facilitate its removal. Suitable examples of solvents which may be used are heptane, toluene and xylene.

Generally, it is preferred that one mole of dicarboxylic acid be used for every mole of amine group to be reacted. It is preferred, but not essential that all the amine groups be reacted with the dicarboxylic acid. A slight excess of either reactant will not alter the utility of the compositions this invention.

In preparing the quaternary ammonium-functional silicon compounds of this invention, carbinol-functional quaternary ammonium compounds are reacted with carboxylic acid-functional silicon compounds at a temperature of from about 40° to 175° C. in the presence or absence of a solvent. The reaction between the carbinol-functional quaternary ammonium compound and carboxylic acid-functional silicon compound forms an ester and water by-product. The water by-product may be removed by using a non-protic solvent, e.g., toluene, which azeotropes with the water, or the water can be removed in vacuum. After the completion of the reaction, the solvent may be removed at a temperature of from 25° to 150° C., preferably at reduced pressure.

The reaction may be effected at a temperature of from 40° to 175° C., and more preferably at a temperature of from 50° to 160° C. Generally, it is preferred that the reaction be conducted in the presence of non-protic solvents.

The non-protic solvents described above may be used in preparing the carboxylic acid-functional quaternary ammonium compounds. The solvent may be removed in vacuum at 25° to 150° C.

A catalyst may be employed to accelerate the reaction between the carboxylic acid-functional silicon compounds and the carbinol-functional quaternary ammonium compounds. Examples of suitable catalysts are bases, such as alkali metal hydroxides or alkoxides; organic and inorganic acids such as hydrochloric acid; titanates such as titanium tetrachloride and tin compounds such as dibutyl tin dilaurate. Generally, a catalyst level of from about 0.1 percent to 10 percent, based on the weight of the reactants will accelerate the reaction.

The mole ratio of the carbinol group linked to the quaternary ammonium compound to carboxylic group linked to the silicon compound may vary over a wide range, e.g., from about 4:1 to 1:10, with the proviso that at least one carbinol group is reacted with one carboxylic acid group.

The carbinol-functional quaternary ammonium compounds may be prepared by conventional processes known in the art. For example, they may be prepared by reacting an alkyl halide containing at least one carbinol group with ammonia or an alkyl or aryl amine.

The counter-ion represented by X in the carbinol-functional quaternary ammonium compound may be any anionic group. Suitable examples of anionic groups are halogen, e.g., chlorine, bromine, iodine and fluorine; methyl sulfate and phosphate anions.

Suitable examples of monovalent hydrocarbon radicals represented by R are alkyl radicals, such as methyl, ethyl, propyl, butyl, hexyl, octyl, decyl, dodecyl, hexadecyl, octadecyl radicals; alkenyl radicals such as the vinyl, allyl as well as octadecenyl radicals; aryl radicals such as phenyl and naphthyl radicals; alkaryl radicals such as tolyl, xylyl and ethylphenyl radicals; cycloalkyl radicals such as cyclobutyl, cyclohexyl and cyclodecyl radicals; aralkyl radicals such as benzyl, 2-phenylethyl and 2-phenylpropyl radicals.

Examples of suitable divalent hydrocarbonoxy radicals represented by $R^1$ are radicals of the formula $(C_nH_{2n}O)_r$ where the terminal carbon atom is linked to the nitrogen atom, r is an average number of from 1 to 50, and n is 2, 3 or 4.

Examples of suitable divalent hydrocarbon radicals represented by $R^1$, $R^2$ and $R^3$ having up to 10 carbon atoms, are methylene, ethylene, trimethylene, tetramethylene, pentamethylene, hexamethylene, octamethylene and decamethylene radicals. Examples of divalent aryl radicals are phenylene, cyclohexenylene and naphthenylene.

Examples of suitable divalent hydrocarbonoxy radicals represented by $R^3$ are hydrocarbonoxy containing radicals of the formula $(C_2H_4O)_r(CH_2)_z$, $(C_3H_6O)_r(CH_2)_z$ and $(C_4H_8O)_r(CH_2)_z$ where r is from 1 to 50 and z is a number of from 1 to 10.

Suitable examples of unsaturated divalent radicals represented by $R^3$ are propenylene, isopropenylene, 2-butenylene, isobutenylene, sec-butenylene, 2-pentenylene, 3-pentenylene, hexenylene, octenylene and decenylene.

The quaternary ammonium-functional silicon compounds of this invention may be used to treat textile materials to impart antistatic properties thereto.

The quaternary ammonium-functional silicon compounds may be applied to textile fabrics in concentrated form or mixed with a dilutent. The amount of quaternary ammonium-functional silicon compound present in the diluent may range from about 0.25 to 99 percent, preferably from about 2 to 50 percent by weight based on the weight of the quaternary ammonium-functional silicon compound and the diluent.

Examples of suitable diluents are organic solvents such as alcohols, e.g., ethanol and 1-propanol; aliphatic hydrocarbon solvents such as heptane and iso-octane; aromatic hydrocarbon solvents such as toluene and xylene and chlorinated hydrocarbon solvents such as chloroform and 1,1,1-trichloroethane. Other diluents which may be employed are organosiloxanes having a viscosity up to 100,000 mPa.s at 25° C., such as hexamethyldisiloxane and dimethylpolysiloxanes; cyclic siloxanes such as octamethylcyclotetrasiloxane; organofunctional polysiloxanes such as aminofunctional polysiloxanes, mercaptofunctional polysiloxanes and carboxylic acid-functional polysiloxanes. Also, the quaternary ammonium-functional silicon compounds may be combined with a diluent such as water.

The quaternary ammonium-functional silicon compounds of this invention, and if desired other substances, may be applied to all textile materials, preferably organic textile materials on which polyorganosiloxanes have been or could have been applied heretofore. Examples of such textile materials are wool, cotton, rayon, hemp, natural silk, polypropylene, polyethylene, polyester, polyurethane, polyamide, cellulose acetate, polyacrylonitrile fibers, and mixtures of such fibers. The textile materials may consist of staple fibers or monofilaments.

The quaternary ammonium-functional silicon compounds of this invention and other substances, if desired, may be applied to the textile materials by any means known in the art, such as by spraying, immersion, padding, calendering or by gliding the fibers across a base which has been saturated with the quaternary ammonium functional silicon compounds of this invention and other materials, if desired.

Generally, the solids add-on is in the range of from 0.001 to 20 percent and more preferably from about 0.05 to 10 percent, based on the original weight of the textile material.

After the textile material has been treated, it is dried at an elevated temperature, e.g., from about 50° to 200° C. for a brief period of time, e.g., from about 3 to 15 minutes.

Specific embodiments of this invention are further illustrated in the following examples in which all parts are by weight unless otherwise specified.

EXAMPLE 1

(a) Preparation of a carboxylic acid-functional silicon compound.

A reaction vessel containing 3.0 parts of phthalic anhydride and 148.1 parts of a trimethylsiloxy-terminated aminopropyl-functional dimethylpolysiloxane having 0.12 milliequivalents per gram of the aminopropyl group and having a viscosity of 192 cs. at 35° C. is heated to 135° C. and then allowed to cool to room temperature. The resultant product is then filtered. A clear, slightly yellow liquid is obtained which has a viscosity of 404 cs at 25° C. and a pH of 6.3. Subsequent infrared analysis indicates the absence of the anhydride, i.e., the C=O group of the phthalic anhydride has absorption bands at about 1850 cm$^{-1}$ and 1765 cm$^{-1}$. The product has a C=O absorption band at about 1720 cm$^{-1}$ and 1650 cm$^{-1}$ indicating cleavage of the anhydride group. A composition having one unit of the formula

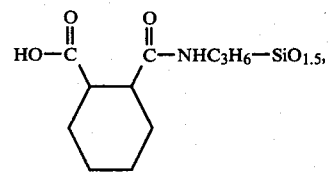

108 $(CH_3)_2SiO$ units and 3.0 $(CH_3)_3SiO_{0.5}$ units is obtained.

(b) Preparation of a quaternary ammonium-functional silicon compound.

To a flask containing 100 parts of the product prepared in Example 1(a) is added 400 parts xylene and 4.5 parts of a carbinol-functional quaternary ammonium compound of the formula

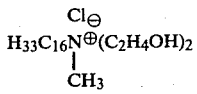

and heated to reflux until 0.21 parts of water are collected.

The xylene is removed in vacumm at 100° C. for 3.0 hours. A translucent, viscous liquid is obtained which has a nitrogen content of 3000 ppm (calculated 3186 ppm) and a chloride content of 3900 ppm (calculated 4004 ppm). Nuclear magnetic resonance analysis and infrared analysis confirm the formation of a quaternary ammonium-functional silicon compound.

EXAMPLE 2

(a) Preparation of a carboxylic acid-functional silicon compound.

To a reaction vessel is added 361.1 parts of succinic anhydride and 4240 parts of a trimethylisiloxy-terminated aminopropyl-functional dimethylpolysiloxane having a viscosity of 18 cs at 25° C. and a base content of 0.85 milliequivalents per gram. The temperature in the reaction vessel increases about 7° C. as a result of the exothermic reaction.

The reaction vessel is heated at 110° C. and maintained at this temperature for 5 hours. The product is cooled to room temperature and filtered. A clear, yellow liquid having a viscosity of 394 cs at 25° C. is obtained. Nuclear magnetic resonance analysis indicates that one

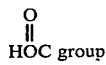

is present for every 20.2=—Si(CH$_3$)$_2$ groups.

(b) Preparation of a quaternary ammonium-functional silicon compound.

To a flask containing 500 parts of the product prepared in Example (2a) is added 1000 parts of xylene and 148.8 parts of a carbinol-functional quaternary ammonium compound of the formula

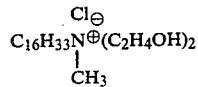

and heated to reflux until 7 parts of water are collected. The xylene is removed in vacuum at 100° C. for 5.0 hours. A translucent, viscous liquid is obtained which has a nitrogen content of 1.55 percent (calculated 1.7 percent) and a chloride content of 1.95 percent (calculated 2.1 percent). Nuclear magnetic resonance analysis and infrared analysis confirm the formation of a quaternary ammonium-functional silicon compound.

EXAMPLE 3

(a) Preparation of a carboxylic acid-functional silicon compound.

To a reaction vessel is added 88.9 parts of phthalic anhydride and 372.9 parts of a trimethylsiloxy-terminated 2-aminoethyl-3-aminopropyl-functional dimethylpolysiloxane having a viscosity of 36 cs. at 25° C. and a base content of 1.61 milliequivalents/g. The vessel is heated to 130° C. at which time a slight exotherm is observed. The reaction vessel is then cooled to ambient temperature with agitation. An amber, viscous liquid is obtained. Infrared analysis confirms the absence of phthalic anhydride and the presence of the carboxylic acid-functional group.

(b) Preparation of a quaternary ammonium-functional silicon compound.

To a flask containing 500 parts of the product prepared in Example (3a) is added 1000 parts of xylene and 67.8 parts of a carbinol-functional quaternary ammonium compound of the formula

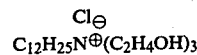

and heated to reflux until 11.5 parts of water are collected. The xylene is removed in vacuum at 100° C. for 3.0 hours. A translucent gum is obtained which has a nitrogen content of 2.1 percent (calculated 2.4 percent) and a chloride content of 1.85 percent (calculated 2 percent). Nuclear magnetic resonance analysis and infrared analysis confirm the formation of a quaternary ammonium-functional silicon compound.

EXAMPLE 4

To a reaction vessel is added 58.8 parts of maleic anhydride and 372.9 parts of a trimethylsiloxy-terminated 2-aminoethyl-3-aminopropyl-functional dimethylpolysiloxane having a viscosity of 36 cs. at 25° C. and a base content of 1.61 milliequivalents/g. The reaction vessel is heated to 45° C. at which time a 43° C. exotherm is observed. The reaction product is then cooled to ambient temperature with agitation. The resultant product is an amber liquid having a viscosity greater than 100,000 cs. at 25° C. and an acid content of 1.5 milliequivalents/g, (calculated 1.61). Infrared analysis confirms the absence of maleic anhydride and the presence of a carboxylic acid-functional group.

(b) Preparation of a quaternary ammonium-functional silicon compound.

To a flask containing 500 parts of the product prepared in Example (4a) is added 1000 parts of toluene and 141 parts of a carbinol-functional quaternary ammonium compound of the formula

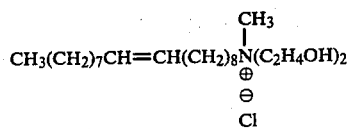

and heated to reflux until 12.5 parts of water are collected. The toluene is removed in vacuum at 100° C. for 3.0 hours. A translucent gum is obtained which has a nitrogen content of 2.6 percent (calculated 2.8 percent) and a chloride content of 1.8 percent (calculated 1.9 percent). Nuclear magnetic resonance analysis and infrared analysis confirm the formation of a quaternary ammonium-functional silicon compound.

EXAMPLE 5

The procedure of Example 1 is repeated except no xylene is used and the reactants are heated at 120° C. at 1 torr for about 18 hours. A translucent viscous liquid is obtained which has a nitrogen content of 2985 ppm (calculated 3186 ppm) and a chloride content of 3975 ppm (calculated 4040 ppm). Nuclear magnetic resonance analysis and infrared analysis confirm the formation of a quaternary ammonium-functional silicon compound.

EXAMPLE 6

A reaction vessel containing 902 parts of a carboxylic acid-functional silicon compound having 2 units of the formula $(CH_3)_3SiO_{0.5}$, 50 units of the formula

and 3 units of the formula

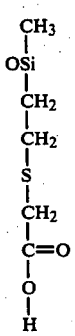

2,000 parts of xylene and 180.8 parts of a carbinol-functional quaternary ammonium compound of the formula

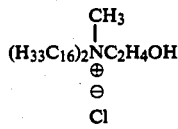

are heated to reflux until 5.2 parts of water are collected. The xylene is removed in vacuum at 100° C. for 3.0 hours. A transluscent, viscous liquid having a nitrogen content of 0.69 percent (calculated 0.72 percent) and a chloride content of 1.69 percent (calculated 1.8 percent) is recovered. Nuclear magnetic resonance analysis and infrared analysis confirm the formation of a quaternary ammonium-functional silicon compound.

EXAMPLE 7

A reaction vessel containing 447.1 parts of a carboxylic acid-functional silicon compound having 2 units of the formula $(CH_3)_3SiO_{0.5}$, 50 units of the formula

and 3 units of the formula

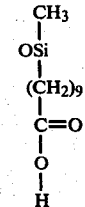

200 parts xylene and 180.8 parts of a carbinol-functional quaternary ammonium compound of the formula

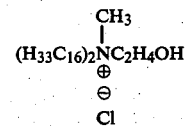

are heated at reflux until 5.2 parts of water are collected. The xylene is removed in vacuum at 100° C. for three hours. A translucent, viscous liquid having a nitrogen content of 0.55 percent (calculated 0.6 percent) and a chloride content of 1.4 percent (calculated 1.5 percent) is recovered. Nuclear magnetic resonance analysis and infrared analysis confirm the formation of a quaternary ammonium-functional silicon compound.

EXAMPLE 8

To illustrate the antistatic properties of the quaternary ammonium-functional silicon compounds of this invention, a 100 percent polyester fabric is treated with the compositions prepared in the Examples and the surface resistivity was determined. The following table shows the results.

| Composition Example No. | Fabric | Surface Resistivity Ohms |
|---|---|---|
| 1 | Dacron T-54 | $1.5 \times 10^{13}$ |
| 2 | Dacron T-54 | $1.7 \times 10^{10}$ |
| 3 | Dacron T-54 | $1.8 \times 10^{10}$ |
| 4 | Dacron T-54 | $1.6 \times 10^{10}$ |
| 5 | Dacron T-54 | $1.7 \times 10^{13}$ |
| 6 | Dacron T-54 | $1.3 \times 10^{10}$ |
| 7 | Dacron T-54 | $1.2 \times 10^{10}$ |
| 8 | Dacron T-54 | $1.5 \times 10^{11}$ |
| None | Dacron T-54 | $1.02 \times 10^{15}$ |

What is claimed is:

1. A process for preparing quaternary ammonium-functional silicon compounds which comprises reacting a carbinol-functional quaternary ammonium compound with a carboxylic acid-functional silicon compound.

2. The process of claim 1, wherein the carboxylic acid-functional silicon compound is obtained from the reaction of an aminofunctional polysiloxane and a dicarboxylic acid.

3. The process of claim 1, wherein the carboxylic acid-functional silicon compound is obtained from the reaction of an aminofunctional polysiloxane and a cyclic anhydride.

4. The process of claim 2, wherein the aminofunctional polysiloxane has at least one unit of the formula

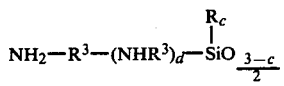

where R is a monovalent hydrocarbon radical having from 1 to 22 carbon atoms, $R^3$ is a divalent radical selected from the group consisting of a saturated divalent hydrocarbon radical having up to 10 carbon atoms, a divalent hydrocarbonoxy radical in which the oxygen is in the form of an ether linkage and an unsaturated divalent hydrocarbon radical having from 3 to 10 carbon atoms, c is 0, 1, 2 or 3 and d is 0, 1 or 2.

5. The process of claim 4, wherein the aminofunctional polysiloxane has at least one unit of the formula

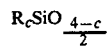

where R is a monovalent hydrocarbon radical having from 1 to 22 carbon atoms, and c is 0, 1, 2 or 3.

6. The process of claim 2, wherein the aminofunctional polysiloxane is an aminoalkylalkoxypolysiloxane.

7. The process of claim 2, wherein the aminofunctional polysiloxane is an aminoalkylalkoxypolysiloxane.

8. The process of claim 6, wherein the aminoalkylalkylpolysiloxane has at least one unit of the formula

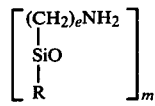

where R is a monovalent hydrocarbon radical having from 1 to 22 carbon atoms, e has a value of at least one and m has a value of from 1 to 1000.

9. The process of claim 3, wherein the aminofunctional polysiloxane has at least one unit of the formula

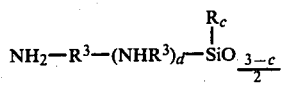

where R is a monovalent hydrocarbon radical having from 1 to 22 carbon atoms, $R^3$ is a divalent radical selected from the group consisting of a saturated divalent hydrocarbon radical having up to 10 carbon atoms, a divalent hydrocarbonoxy radical in which the oxygen is in the form of an ether linkage and an unsaturated divalent hydrocarbon radical having from 3 to 10 carbon atoms, c is 0, 1, 2 or 3 and d is 0, 1 or 2.

10. The process of claim 9, wherein the aminofunctional polysiloxane has at least one unit of the formula

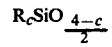

where R is a monovalent hydrocarbon radical having from 1 to 22 carbon atoms, and c is 0, 1, 2 or 3.

11. The process of claim 3, wherein the aminofunctional polysiloxane is an aminoalkylalkylpolysiloxane.

12. The process of claim 3, wherein the aminofunctional polysiloxane is an aminoalkylalkoxypolysiloxane.

13. The process of claim 11, wherein the aminoalkylalkylpolysiloxane has at least one unit of the formula

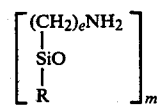

where R is a monovalent hydrocarbon radical having from 1 to 22 carbon atoms, e has a value of at least one and m has a value of from 1 to 1000.

14. The process of claim 1, wherein the carbinol-functional quaternary ammonium compound is selected from the group consisting of compounds having the formulas

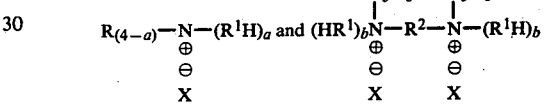

in which R is a monovalent hydrocarbon radical having from 1 to 22 carbon atoms, $R^1$ is a hydrocarbonoxy radical having the formula $-(C_nH_{2n}O)_r$, $R_2$ is a divalent hydrocarbon radical having from 2 to 10 carbon atoms, X is an anionic radical, a is a number of from 1 to 4, b is a number of from 1 to 3, n is 2, 3 or 4 and r is a number of from 1 to 50.

15. The process of claim 1, wherein the mole ratio of the carbinol group linked to the carbinol-functional quaternary ammonium compound to carboxylic group linked to the carboxylic acid-functional silicon compound is in the range of from 4:1 to 1:10 with the proviso that at least one carbinol group is reacted with one carboxylic acid group.

16. The process of claims 1, 14 or 15, wherein the reaction is conducted in the presence of a non-protic solvent.

17. The process of claims 1, 14 or 15, wherein the reaction is conducted at a temperature of from 40° up to about 175° C.

* * * * *